May 22, 1928.
J. A. SMITMANS
1,670,789
GAUGE FOR METAL WORKING MACHINES
Filed Aug. 5, 1925   2 Sheets-Sheet 2
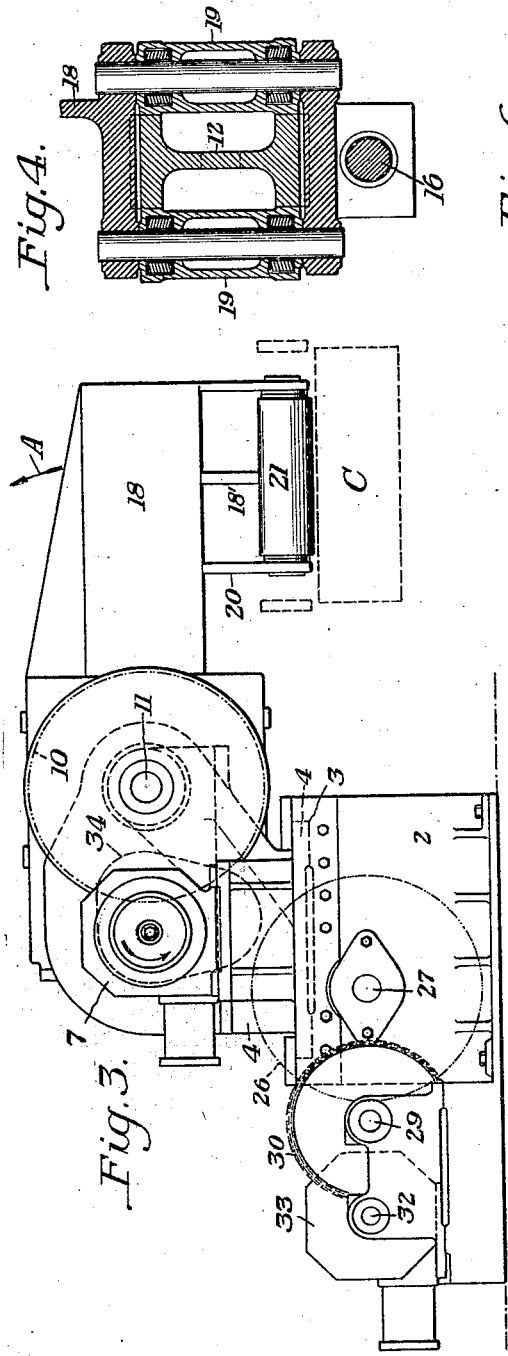
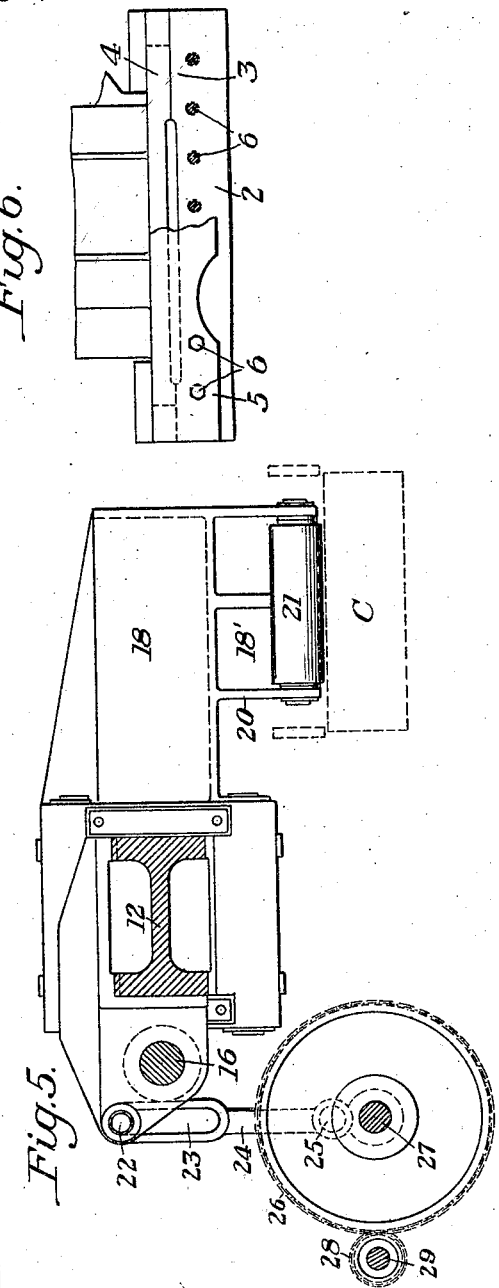

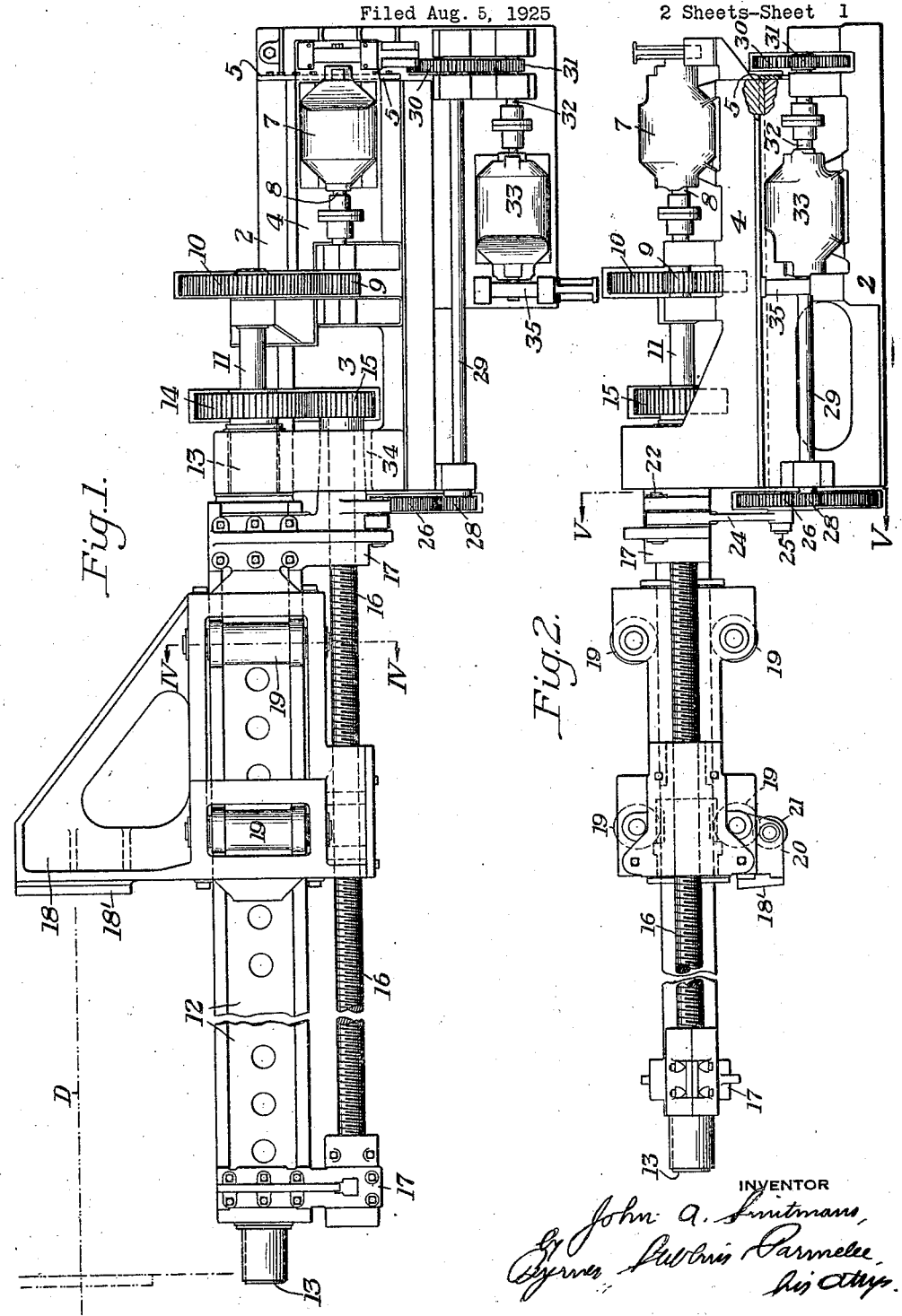

Patented May 22, 1928.

1,670,789

UNITED STATES PATENT OFFICE.

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

GAUGE FOR METAL-WORKING MACHINES.

Application filed August 5, 1925. Serial No. 48,293.

The present invention relates broadly to the art of metal working, and more particularly to a gauge adapted for cooperation with metal working machines whereby successive lengths of material may be quickly and accurately measured.

At the present time it is customary in the art to which this invention relates to deliver material by suitable means, such, for example, as a conveyor or roll table, to a shear or other desired mechanism, provide a gauge adapted to engage the leading end of the material for engaging the proper length of the piece to be sheared, and then shear the material. Gauges as ordinarily used heretofore have not been altogether satisfactory, due either to the lack of flexibility as to adjustment or range of use, or to the difficulty with which they have been movable into and out of operative position without combining or movement of the material having the operation performed thereon.

The present invention has for one of its objects the provision of an improved gauge effective for quickly and accurately determining a predetermined length of material, adjustable so as to be operable over any desired range and movable to inoperative position under such conditions as to tend to move away from the material being measured and thereby prevent undesirable movement thereof.

In the accompanying drawings there is shown, for purposes of illustration only, a preferred embodiment of the present invention, it being understood that the drawings do not define the limits of my invention, as changes in the construction and operation disclosed therein may be made without departing either from the spirit of the invention or the scope of my broader claims.

In the drawings:

Figure 1 is a top plan view, partly broken away, illustrating one form of gauge constructed in accordance with the present invention;

Figure 2 is a side elevational view of the construction illustrated in Figure 1;

Figure 3 is an end elevational view on an enlarged scale of the gauge shown in Figures 1 and 2, certain of the gears being indicated in chain lines only for the sake of clearness;

Figure 4 is a detail sectional view on an enlarged scale on the line IV—IV of Figure 1;

Figure 5 is a transverse sectional view on an enlarged scale on the line V—V of Figure 2, looking in the direction of the arrows; and Figure 6 is a detail view, partly in elevation and partly broken away, for the purpose of more clearly illustrating the construction and operation of the safety slide and plate.

In carrying out the present invention, there may be provided a suitable bed plate 2 having formed on the upper surface thereof a slideway 3 adapted for the reception of a slide 4. The slide 4 is normally held against endwise movement relatively to the bed plate by the provision of a safety plate 5 bolted over the end of the slide, as clearly shown in Figures 3 and 6, by bolts 6 having a strength sufficient to withstand normal operating conditions but constructed to fracture in the event of an undue strain or load on the slide.

Mounted on the slide is a motor 7, the armature shaft 8 of which is adapted to drive a pinion 9 meshing with a gear 10 on one end of a shaft 11. The shaft 11 is journaled in bearings projecting upwardly from the slide 4 with the axis of rotation coincident with that of a gauge beam 12 projecting outwardly from the slide and rotatable about trunnions 13. Also secured to the shaft 11 is a second gear 14 meshing with a similar gear 15 on one end of a screw shaft 16 journaled at its ends in brackets 17 carried by a gauge beam 12. By reason of this construction it will be apparent that upon operation of the motor 7 the screw shaft 16 may be rotated in either a clockwise or a counterclockwise direction, as desired.

Rotation of the screw shaft is in turn effective for obtaining the desired positioning of a gauge 18. This gauge carries antifriction rollers 19 suitably mounted therein and cooperating with opposite sides of the gauge beam 12 to facilitate movement of the gauge lengthwise of the beam. Projecting downwardly from the free end of the gauge are arms 20 carrying a roller 21 adapted to overlie the conveyor C, by means of which the material to be sheared is delivered to the gauge, the line of delivery of the conveyor being indicated by the chain line D in Figure 1. The gauge 18 preferably carries a gauge plate 18' of the construction clearly shown in Figure 2, having its face downwardly and forwardly inclined with relation to the direction of travel of the material being measured.

In the operation of the apparatus the conveyor is actuated to bring a length of material into abutting engagement with the gauge plate 18'. The gauge is thereupon effective for arresting further movement of the material, it being understood that the gauge has previously been set in such manner as to arrest such movement in a position in which the desired length of material is measured. Thereupon the material may be sheared, and the conveyor operated for carrying the sheared material to the desired point. It will be obvious, however, that in order to permit the onward travel of such sheared length the gauge must be swung upwardly out of the line of travel of the material. This may be accomplished by providing one of the brackets 17, as clearly shown in Figure 5, with a pin 22 adapted to pass through a slot 23 in the upper end of a link 24 the lower end of which cooperates with an eccentric pin 25 on a gear 26. This gear may be mounted in any desired manner for rotation about a short shaft 27 and may be driven by a pinion 28 carried by an intermediate shaft 29 journaled in the bed plate 2 and having secured to its opposite end a gear 30 driven by a pinion 31 on the armature shaft 32 of a beam rocking motor 33.

With the construction before described it will be apparent that operation of the motor 33 in the desired direction will be effective for rotating the gauge beam about its longitudinal axis to thereby swing the gauge upwardly, as indicated by the arrow A in Figure 3. This swinging movement is permitted by providing the bearing which carries the inner trunnion of the gauge beam with a window 34, clearly shown in dotted lines in Figure 3, through which the inner end of the screw shaft 16 and the inner bracket 17 may project and swing. As the gauge 18 moves in the direction of the arrow A the gear 14 is effective for producing rotation of the gear 15 in a counterclockwise direction, as viewed in Figure 3. This will in turn rotate the screw shaft 16 in such manner as to tend to back the gauge away from the leading end of the material and thereby obviate the possibility of lifting such material from the table.

There is a possibility that during the operation of the apparatus an undue thrust may be transmitted by the gauge 18 to the slide 4, such thrust being sufficient to damage the machine unless safety means is provided. This means is present in the form of the plate 5 and the frangible bolts 6, these bolts permitting the entire slide and all of its cooperating mechanism to move bodily in such event.

The beam rocking motor 33 may be provided with a suitable brake 35 by means of which the armature shaft may be held in predetermined position. If for any reason, however, the gauge should be dropped too soon, the roller 21 thereon will engage the upper surface of the material on the conveyor and permit continued travel of the material without injury to the gauge. At the same time, as the sheared end passes under the roller, the roller will be dropped to automatically position the gauge for the next measuring operation.

The advantages of the present invention arise from the provision of a gauge adjustable at will to vary the lengths being measured, the range of adjustment being such as to permit the shearing of a wide variety of lengths.

Further advantages arise from the provision of means for swinging the gauge to inoperative position, and particularly when such movement is accompanied by a lengthwise movement of the gauge such as to ease it away or back it off from the leading end of the material being sheared.

I claim:

1. In an apparatus of the character described, a gauge support, a gauge thereon, and means for simultaneously rotating said support and gauge to inoperative position and for easing said gauge from the material being measured, substantially as described.

2. In an apparatus of the character described, a gauge support, a gauge longitudinally movable thereon, means for effecting longitudinal movement of the gauge in either direction and for maintaining it in adjusted position, and means for swinging said gauge laterally to the direction of movement of the material being gauged to inoperative position, such last mentioned means being effective for producing a longitudinal movement of the gauge simultaneously with the movement thereof to inoperative position, substantially as described.

3. In an apparatus of the character described, a gauge beam, a gauge adjustable thereon, a screw shaft for effecting such adjustment, a motor and gear train for effecting rotation of the screw shaft, a bearing in which said gauge beam is rotatable, at least one of the gears of said gear train having its axis coinciding with the axis of rotation of said beam, and means for effecting rotation of said gauge beam, substantially as described.

4. In an apparatus of the character described, a gauge support, a gauge thereon, a screw shaft for adjusting the position of said gauge, and means for effecting simultaneous rotation of said gauge support and said screw shaft for moving the gauge to inoperative position and at the same time effecting a longitudinal adjustment thereof, substantially as described.

5. In an apparatus of the character described, a bed plate, a slide mounted thereon and carrying a gauge, and frangible means normally preventing movement of said slide, said means being adapted to break under abnormal thrust, thereby preventing injury to the apparatus, substantially as described.

6. In an apparatus of the character described, a bed plate, a slide mounted thereon and carrying a gauge, and frangible means normally preventing movement of said slide, said means being adapted to fracture upon the transmission of undue thrust to said slide for permitting movement thereof away from the material being measured, substantially as described.

7. In an apparatus of the character described, a gauge support, a gauge thereon, said gauge being movable laterally to the direction of longitudinal movement of the material being gauged and adapted to limit such movement thereof, and means for simultaneously moving the gauge out of the path of the gauged material to permit it to continue in its longitudinal movement and for easing the gauge longitudinally from the material substantially as described.

8. In an apparatus of the character described, a gauge support, a gauge mounted thereon and movable longitudinally and laterally thereof, means comprising a rotatable member having its axis coinciding with the axis of the gauge and motion translating means connecting the gauge and the rotatable member for effecting the longitudinal movement of the gauge in either direction and for maintaining it in an adjustable position, and means for swinging said gauge about the gauge support to an inoperative position, whereby upon the occurrence of a swinging motion the rotatable member and the movement translating means react for producing a longitudinal movement of the gauge simultaneously with the swinging movement theerof to inoperative position, substantially as described.

In testmony whereof I have hereunto set my hand.

JOHN A. SMITMANS.